United States Patent [19]

Kaihara et al.

[11] 4,174,480

[45] Nov. 13, 1979

[54] METHOD OF DETECTING DEFECTIVE PORTIONS OF METALLIC TANK HAVING THERMALLY PROTECTIVE COATING OF POLYURETHANE FOAM

[75] Inventors: Takashi Kaihara; Masao Taneoka; Toshitsugu Kusaka, all of Muroran, Japan

[73] Assignee: Nippon Oil Company, Limited, Tokyo, Japan

[21] Appl. No.: 858,902

[22] Filed: Dec. 8, 1977

[30] Foreign Application Priority Data

Dec. 9, 1976 [JP] Japan .................................. 51/147149

[51] Int. Cl.² ............................................. G01J 1/00
[52] U.S. Cl. ..................................... 250/342; 250/339
[58] Field of Search ............... 250/338, 339, 340, 342, 250/334; 73/355 R, 15 R, 15 FD

[56] References Cited

U.S. PATENT DOCUMENTS

| | | | |
|---|---|---|---|
| 3,791,194 | 2/1974 | Pontello | 73/15 FD |
| 3,933,044 | 1/1976 | Loper et al. | 250/342 |
| 4,005,289 | 1/1977 | Del Grande | 250/339 |

*Primary Examiner*—Bruce C. Anderson

[57] ABSTRACT

Defective portions of a metallic tank storing hot hydrocarbon oil therein and having a thermally protective coating of polyurethane foam adhered onto the side wall thereof, are detected by determining a distribution of surface temperatures of the coating. Portions of the coating of relatively high temperatures correspond to defective portions of the coating which cause corrosion of the side wall of the tank, and in turn underlying corroded areas in the side wall.

6 Claims, 8 Drawing Figures

(1)

(2)

(3)

(4)

METHOD OF DETECTING DEFECTIVE PORTIONS OF METALLIC TANK HAVING THERMALLY PROTECTIVE COATING OF POLYURETHANE FOAM

The present invention relates to a method of detecting defective portions of a metallic tank storing hot hydrocarbon oil therein and having a thermally protective coating of polyurethane foam on the side wall thereof, that is corroded areas in the side wall and defective portions of the protective coating of polyurethane foam, which cause such corrosion of the side wall of the tank.

For thermal protection or insulation of tanks, such as those for storing hot hydrocarbon oils, thermally protective porous or fibrous mineral materials, such as calcium silicate and rock wool, were generally employed in the past together with covering materials, such as zinc-plated steel panel.

Since about 1969, there has been adopted a method of construction wherein a protective coating of rigid polyurethane foam is formed in situ on the side wall of the tank by gun-spraying. This is because such a method is advantageous in various aspects. Among others, this material can be of a closed cell structure and, thus, when compared with the conventional thermally protective porous or fibrous materials, it has a reduced water regain or water uptake and exhibits an enhanced ability of keeping warmth. In addition, thereto, no covering material, such as zinc-plated steel panel is required. The cost of construction is cheap. The period of time required for construction is short. It is easy to repair, and no scaffold is required. As shown in FIG. 1, the coating of polyurethane foam may be applied to the side wall of the tank by spraying onto the outer surface of side wall 1 of the tank a rigid polyurethane-forming composition, primarily comprised of at least one polyol and at least one polyisocyamate, together with a foaming agent, such as "Freon", to form a layer of foamed polyurethane 2.

In order to impart flame retardant properties to the resulting rigid polyurethane foam, halogen- or phosphorus-containing organic compounds may be usually added to the polyurethane-forming composition, or polyurethane-forming reactants containing halogen and/or phosphorus atoms in the molecule may be employed. If desired, a fire proof coating 3 may be applied by spraying on the outer surface of the rigid polyurethane foam coating 2.

With respect to such steel tanks having a protective coating of polyurethane foam, especially those tanks which have been used for storing hot hydrocarbon oils, such as hot fuel oil, at a temperature of from about 70° C. to about 80° C., for several years, occurance of local corrosions has been recently noted on the surface of the side wall of the tank and has become an issue. It has been found that absorption of water by the polyurethane foam results in such corrosions which occur irregularly and locally.

While the rigid polyurethane foam in itself is inherently water-repellent and of a closed cell structure, it is believed that the polyurethane foam absorbs water or comes to absorb water for the following reasons.

(1) Portions where foaming has been intensive open cells have been formed, which may absorb water.

(2) When the polyurethane foam is exposed to elevated temperatures of from about 70° C. to about 80° C. for prolonged period of time, it is gradually degraded and comes to absorbs water. In this connection it should be noted that the water regain or uptake of a typical closed cell rigid polyurethane foam drastically increases as the temperature increases (see FIG. 2).

(3) Rain penetrates into the foam from portions where finish for preventing rain penetration is not good, which finish is to be applied to the upper and lower ends of the polyurethane foam coating or to those portions where a stair-case or ladder is located, or from portions where cracks have formed in the coating or where one shot of the coating composition is contiguous to another shot.

(4) A fire proof coating 3, is any, is hydrophilic and absorbs water, thus promoting water uptake of the coating of polyurethane foam.

Once water has been included in the polyurethane foam, it reacts with $Cl^-$ and/or $PO_4^{---}$ to form acids, which will corrode the metallic side wall of the tank.

Analysis of samples of water included in the protective coating of polyurethane foam has revealed a pH of 4.0 to 6.0 and the presence of $Cl^-$, $PO_4^{--}$ annd P.

In order to completely repair the coating of polyurethane foam which has substantially absorbed water, the whole of the coating or at least those portions of the coating covering lower portions of the side wall of the tank, where corrosion has intensively occurred, may be peeled off and replaced with a fresh protective material. Obviously, such a method is too expensive to be practiced in view of increased costs of repair and energy consumption required for keeping warmth of the contents of the tank during repairing.

Accordingly, it is an object of the present invention to provide a method of detecting defective portions of a metallic tank for storing hot hydrocarbon oils which has a thermally protective coating of polyurethane foam adhered onto the side wall thereof, that is defective portions of the coating, where water has been included, and in turn underlying corroded areas in the side wall, by which method defective portions both in the coating and in the side wall of the tank can be readily and rapidly detected with low costs, indicating the locations necessary to be repaired.

Other objects and features of the present invention will be apparent from the following description with reference to the accompanying drawings, in which:

FIG. 5 (2) shows the section of the coating of polyurethane foam peeled from the tank showing the distribution of water contents of the foam;

FIG. 5 (3) shows the distribution of corroded areas in the side wall of the tank; and FIG. 5 (4) shows the section of the coating of the polyurethane foam peeled from the tank showing the distribution of the surface temperatures of the foam.

The invention is based on a discovery of the fact that when polyurethane foam has absorbed water, the thermal conductivity of the foam increases and, thus, heat is transmitted from the hot hydrocarbon oil in the tank through the side wall and the coating of wet polyurethane foam towards the outer surface of the coating, resulting in rise in the surface temperature of the coating. Thus, in accordance with the present invention there is provided a method of detecting defective portions of a metallic tank storing hydrocarbon oil therein and having a thermally protective coating of polyurethane foam adhered onto the side wall thereof, in which method corroded areas in the side wall of the tank and defective portions of said coating of polyurethane foam, which cause corrosion of the side wall of the tank, are detected by determining a distribution of surface temperatures of said coating of polyurethane foam.

Figure 1:
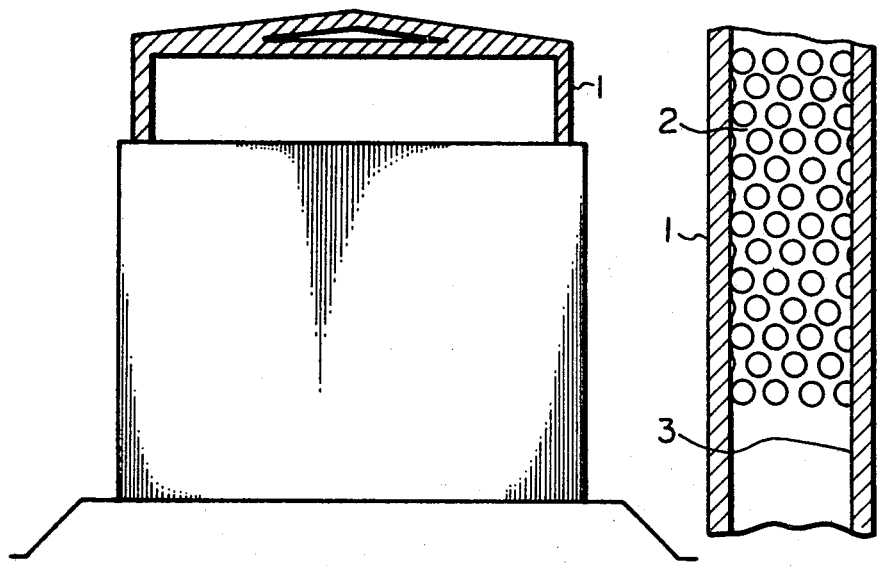
FIG. 1 shows a tank in side elevation with a protective coating applied on the side walls thereof, and an enlarged detail of the applied protective coating of a polyurethane-forming composition.
Figure 2:
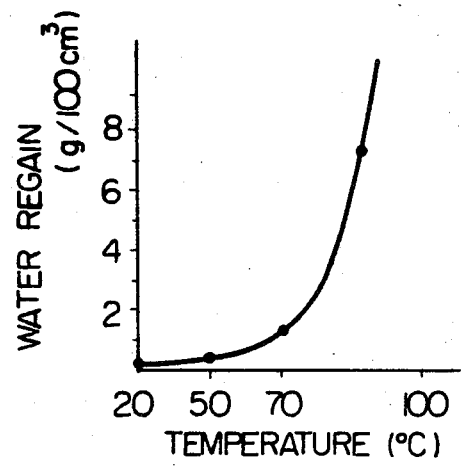
FIG. 2 shows the relationship between water regain of polyurethane foam and temperature.
Figure 3:
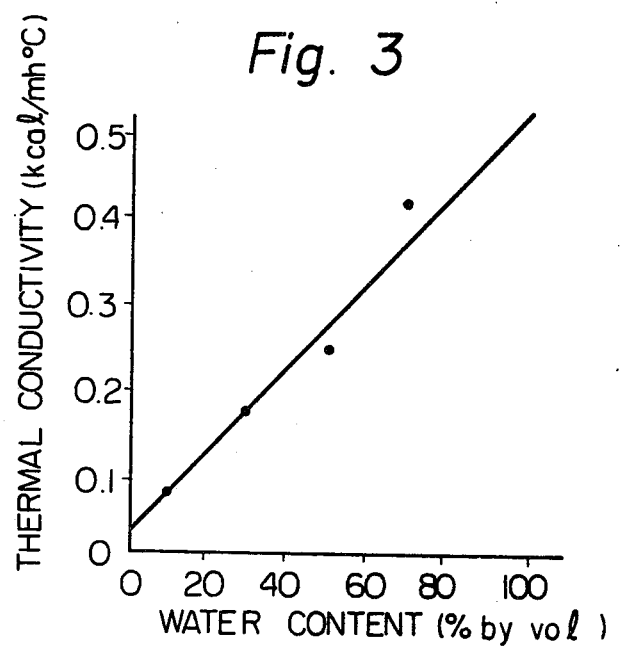
FIG. 3 shows the relationship between water content of polyurethane foam and thermal conductivity thereof.

FIG. 3 shows a relation between the water content V (in % by volume) of a sample of a typical rigid polyurethane foam and the thermal conductivity $\lambda$ (in Kcal./m.hr. °C.) of the sample, wherein the plotted points represent values of $\lambda$ experimentally determined by using a non-stationary thermal ray method whereas the straight line represents calculated values of $\lambda th$ in accordance with the following equation (1).

$$\lambda th = 0.0166 = 0.494 \, V/100 [Kcal/mhr \, °C.] \quad (1)$$

wherein V is the water content in % by volume of polyurethane foam and $\lambda th$ is a theoretical value of the thermal conductivity of polyurethane foam containing V% by weight of water.

As seen from FIG. 3, found values $\lambda$ of the thermal conductivity of polyurethane foam are well in compliance with theoretical values $\lambda th$ and in good corelation to the water content V of the polyurethane foam. This fact could also be established with an actual tank having a coating of polyurethane foam by determining the thermal conductivity of the polyurethane foam coating from the surface temperature of the coating and the temperature of the oil stored in the tank, and checking the relation between the determined thermal conductivity and the water content of the coating.

Figure 4:
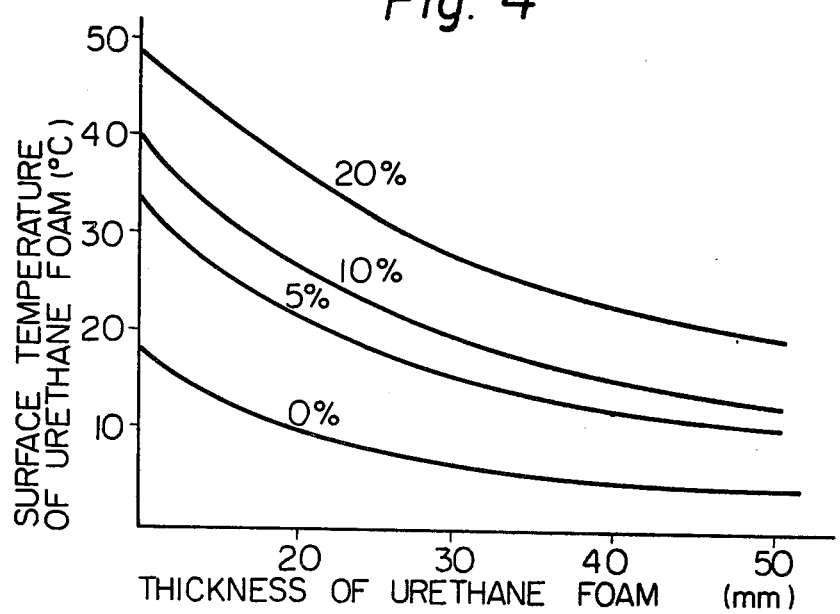
FIG. 4 shows the relationship between the surface temperature of polyurethane foam and the thickness thereof at different water contents.

It is reasonably expected that the surface temperature of the polyurethane foam will depend not only upon the water content of the foam but also upon the thickness of the foam. Therefore, we have checked the relation between the surface temperature and the thickness of the coating with respect to each of various coatings of polyurethane foam with different water contents. The results are shown in FIG. 4.

As a result, it has been found that within the practical thickness range of at least about 20 mm, the surface temperature of the coating is affected by the water content of the coating to a greater extent than by the thickness of the coating. This means that a slight variation in the thickness of the sprayed and foamed layer of polyurethane does not seriously affect the surface temperature of the resultant coating of polyurethane foam, and suggests that it is possible to determine approximate water contents of sections of the polyurethane foam coating of the tank by measuring surface temperatures of the respective sections of the coating.

In the practice of the method of the invention it is preferred to determine a distribution of surface temperatures of the coating of polyurethane foam by taking an infrared thermal image of the outer surface of the coating and analyzing the so-taken thermal image to detect portions of the coating of relatively high temperatures. For this purpose it is convenient to use so-called thermography devices, such as "Thermo-camera" CT-4B commercially available from Cannon KK, or "Thermoviewer" JTG-IB commercially available from Nippon Denshi KK. By using such a device, a delicate distribution of temperatures may be taken as a photographic image or an image on a blown tube. This is advantageous in that surface temperatures on a wide surface, such as the outer surface of the side wall of a tank, may be concurrently detected within a short period of time.

One preferred procedure for carrying out the method of the invention can be as follows.

(1) The tank is filled with hot hydrocarbon oil to such an extent that the level of the oil is above the upper end of the protective coating of polyurethane which has been applied onto the side wall of the tank.

(2) An infrared thermal image of the outer surface of the coating is taken in the absense of direct sun shine, i.e. at night or on a cloudy day, by means of a suitable thermography device, and the position where the device is set is marked.

(3) A normal photographic image of the tank is taken with a normal camera from the above-mentioned marked position.

(4) The thermal image is enlarged or reduced in dimension so as to conform to the normal photographic image.

(5) The resultant thermal image is transferred onto a transparent plastics sheet using different colors for respective sections indicating different temperatures.

(6) The colored image on the transparent sheet is superimposed and adhered onto the normal photographic image.

(7) With the element so prepared it is possible to determine the location, shape and dimension of each defective portion of the tank.

Figure 5:
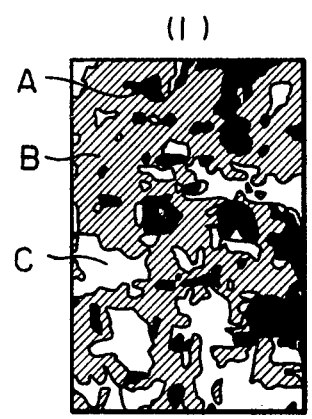
FIG. 5 (1) shows a section of a coating of polyurethane foam peeled from a tank showing the distribution of the thickness of the foam.
Figure 5:
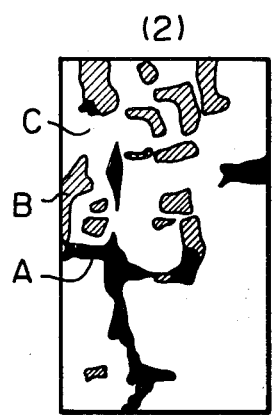
Figure 5:
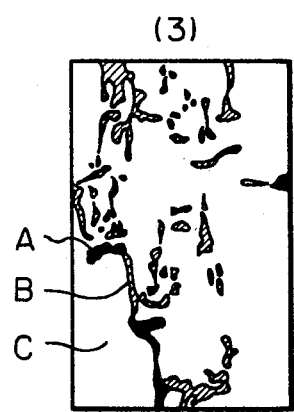
Figure 5:
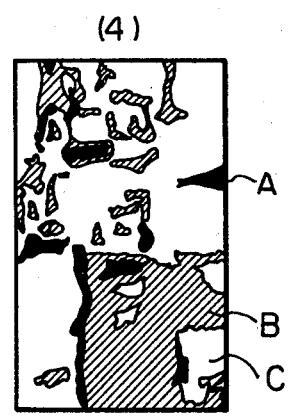

Using a thermography device applicable for detecting temperatures of $-20°$ C. to $1850°$ C., and having a temperature resolution ability of $0.1°$ C. and the number of image elements of 20,000, an infrared thermal image of a polyurethane coated tank filled with fuel oil at $75°$ C. was taken at night. The coating of polyurethane foam was peeled off and cut into small square sections. For each section of polyurethane foam, the thickness and water content were determined and the area of the side wall underlying the section was examined so as to find the extent of corrosion. The results are shown in FIGS. 5 (1) through (4). FIG. 5 (1) shows the distribution of thickness of the foam, in which A stands for relatively thick sections, B for sections of intermediate thickness and C for relatively thin sections. FIG. 5 (2) shows the distribution of water contents of the foam, in which A stands for sections of relatively high water uptake, B for sections of intermediate water uptake and C for relatively low water uptake. FIG. 5 (3) shows the distribution of corroded areas in the side wall of the tank, in which A stands for fairly corroded areas, B for slightly corroded areas and C for non-corroded areas. FIG. 5 (4) shows the distribution of surface temperatures of the foam, in which A stands for sections of relatively high temperatures, B for sections intermediate temperatures and C for sections of relatively low temperatues.

It can be seen from FIGS. 5 (2), (3) and (4) that the distribution of the distribution of surface temperatures of the polyurethane foam depicted in FIG. 5 (4) fairly corresponds to the distribution of water contents of the foam shown in FIG. 5 (2) and to the distribution of corroded areas in the side wall as shown in FIG. 5 (3). Furthermore, FIG. 5 (1) reveals that the involved variation in the thickness of the foam is totally irrelevent to the distributions of the other parameters.

It will be appreciated that the method described herein make it possible to readily and rapidly detect defective portions of the coating of polyurethane foam as well as corroded areas in the side wall of the tank. The detected defective portions and corroded areas may be suitably repaired.

According to our calculation, it has been found that the costs of repair, incurred in detecting defective portions of the polyurethane foam by the method of the invention and repairing only those detected portions, are only about 20 to 30% of the costs required in the case wherein the whole of the protective coating is peeled off and a fresh coating is substituted therefor.

What is claimed is:

1. A method of detecting defective portions of a metallic tank storing hot hydrocarbon oil therein and having a thermally protective coating of polyurethane foam adhered onto the side wall thereof, comprising the steps of determining a distribution of surface temperatures of said coating of polyurethane foam by taking an infrared thermal image of the outer surface of said coating of polyurethane foam, and analyzing said infrared thermal image to determine portions of said coating having relatively high temperatures, whereby corroded areas in the side wall of the tank and defective portions of said coating of polyurethane foam which cause corrosion of the side wall of the tank are detected.

2. A method in accordance with claim 1, wherein said infrared thermal image of the outer surface of said coating of polyurethane foam is taken in the absense of direct sunshine with said tank filled with a liquid to be stored therein to such an extent that the level of said liquid filled in said tank is above the upper edge of said coating of polyurethane foam.

3. A method in accordance with claim 1 wherein said coating of polyurethane foam has a thickness in excess of about 20 mm.

4. A method in accordance with claim 2 wherein said coating of polyurethane foam has a thickness in excess of about 20 mm.

5. A method according to claim 2, wherein said infrared thermal image is taken by a thermal camera means located at a set position, said method further comprising the steps of taking a normal photographic image of the tank with a normal camera from said set position, and superimposing and adhering said infrared thermal image onto said normal photographic image to determine the location, shape and dimension of each defective portion of the tank.

6. A method according to claim 5, wherein prior to superimposing said images, the infrared thermal image is enlarged or reduced in dimension so as to conform to the normal photographic image, and transferred onto a transparent plastics sheet wherein different colors are used for respective sections indicating different temperatures.

* * * * *